J. P. LARRIMER.
TIRE.
APPLICATION FILED NOV. 27, 1914.
1,239,278.
Patented Sept. 4, 1917.
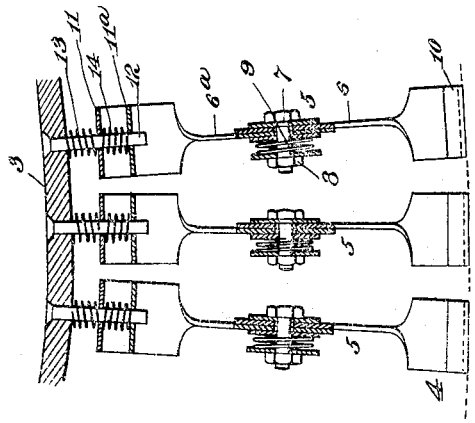
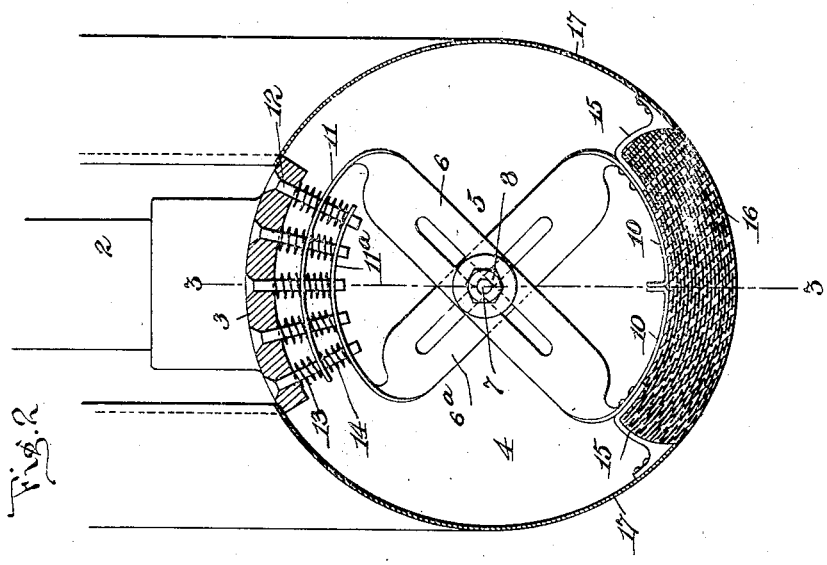
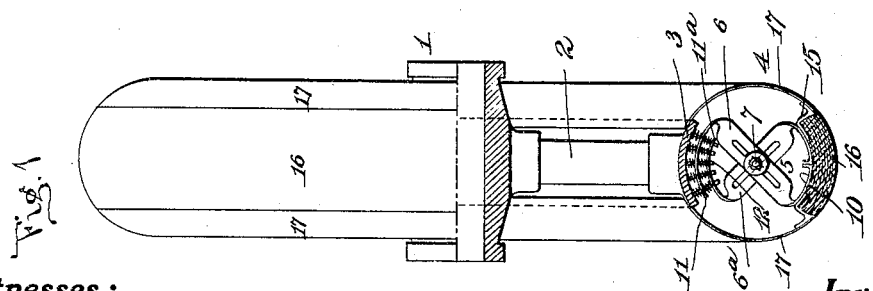
Witnesses:
Jacob Schechter
John L. Lotsch
Inventor
Jesse P. Larrimer
by Waldo G. Morse
Attorneys.

UNITED STATES PATENT OFFICE.

JESSE P. LARRIMER, OF BROOKLYN, NEW YORK.

TIRE.

1,239,278.   Specification of Letters Patent.   Patented Sept. 4, 1917.

Application filed November 27, 1914. Serial No. 874,215.

*To all whom it may concern:*

Be it known that I, JESSE P. LARRIMER, a citizen of the United States, residing in the borough of Brooklyn, county of Kings, State of New York, have invented a certain new and useful Improvement in Tires, of which the following is a specification.

The object I have in view is the production of an elastic spring tire for vehicles.

Another object is to produce a tire which will have all of the resiliency of the pneumatic tire, without its disadvantages.

A further object is to produce a tire which will be cheaper and more durable than pneumatic tires now in use.

A further object is to produce means for adjusting the resiliency of the wheel.

These and further objects will more fully appear from the following specification and accompanying drawings considered together or separately.

My invention is illustrated in the accompanying drawings in which the same parts are designated by similar reference characters in all the figures.

Figure 1 is a partial front view and partial cross-section of a wheel embodying my invention.

Fig. 2 is an enlarged cross-sectional view of the tire; and

Fig. 3 is a section on the line 3—3 of Fig. 2.

According to my invention the wheel comprises a hub 1, spokes 2, felly 3, and tire 4. Carried on the felly at regular intervals around its periphery are toggles 5. Each toggle is composed of a pair of slotted arms 6 and 6ᵃ arranged at substantially right angles to each other and secured together by a bolt 7 which extends through the slot so that the arms may pivot and also move relatively to each other in the direction of the slots. Each bolt is provided with a nut 8 and between the arm 6 and the nut is a spring 9, by which the pressure of the arms with each other may be varied and the resiliency of the tire adjusted.

Each arm 6 and 6ᵃ is provided at its outer end with a wing 10 and these wings are brought together at their extremities to form a support for a tread 16. The inner end of each arm 6 is formed with a wing 11, and the arm 6ᵃ has a similar wing 11ᵃ. The wings 11 and 11ᵃ extend inward toward each other and overlap with a space between them.

Carried by the felly 3 and adjacent to each toggle 5 is a plurality of studs 12 which project radially toward the center of the tire 4, and surrounding each stud and disposed between the felly and the wing 11 is a spiral spring 13. Surrounding each stud and disposed between the wings 11 and 11ᵃ is a similar spring 14.

Carried on each wing 10 is a bracket 15, and between the brackets and secured to the wings is a tread 16. The tread extends around the periphery of the tire and may be formed of any suitable material,—that shown in the embodiment of my invention illustrated, being a laminated structure composed of strips of textile material embedded in a suitable plastic material. Secured to each bracket 15 is an annular shell 17 which reaches from the tread to the felly and prevents the entrance of dirt, grit, etc., to the working parts of the tire, also taking up the side thrust and holding the springs straight.

In the drawings I have shown the toggles as spaced around the felly a short distance apart, but it will be understood that they may be made of such a shape that the parts 10, 11 and 11ᵃ of each toggle may be in actual contact with the corresponding part of its neighboring toggle.

The operation of my improved tire is as follows:

In rolling along a roadway minor shocks will be taken up by the springs 13 and 14 because of the relative movement of the wheel proper and the tire. When the wheel strikes an obstruction and a heavy shock is imparted to the tread the arms 6 and 6ᵃ of the toggle receiving the blow will pivot on the bolt 7, and at the same time the slots in the arms will allow the arms to ride up on the bolt and the shock transmitted to the springs 13 and 14 will be reduced. The wings 10, 11 and 11ᵃ are of sufficient elasticity to take part of the shock so that such shock is divided among the following elements, the wings 10, the friction of the arms 6 and 6ᵃ at their crossing point, the wing 11ᵃ, the springs 14, the wing 11 and the spring 13.

The frictional engagement of the arms 6 and 6ᵃ may be adjusted by means of the nut 8 and the spring 9 to suit various conditions as to the weight of the vehicle, character of the roads over which the car may be expected to travel, speed of the car, etc.

It will be understood that instead of the bolt 7 and spring 9, any other form of friction device may be employed.

The term "toggle" used herein is intended to describe two arms pivoted together in such a manner as to allow relative longitudinal movement of the arms.

In accordance with the provisions of the patent statute, I have described the principle of my invention together with the apparatus which I now consider to represent the best embodiment thereof, but I desire to have it understood that the apparatus shown is merely illustrative, and that the invention can be carried out in other ways without departing from the spirit of my invention.

Having now described my invention, what I claim as new and desire to secure by Letters Patent of the United States, is as follows:

1. A vehicle tire having a felly-member and a tread, resilient arms interposed between the felly-member and tread, means for frictionally engaging the arms together, and means whereby the arms may move longitudinally relatively to each other.

2. A vehicle tire having a felly-member and a tread, resilient arms interposed between the felly-member and tread, adjustable means for frictionally engaging the arms together, and means whereby the arms may move longitudinally relatively to each other.

3. A vehicle tire having a felly-member and a tread, intersecting resilient arms interposed between the felly-member and tread, a spring for causing frictional engagement between the arms, and means whereby the arms may move longitudinally relatively to each other.

4. A vehicle tire having a felly-member and a tread, crossed arms interposed between the felly-member and tread, slots in the arms, a bolt passing through the slots to secure the arms together, and a spring for causing frictional engagement of the arms.

5. A vehicle tire having a felly member, and a tread, resilient arms rigidly secured to the tread, means for permitting relative longitudinal movement of the arms, and a cushioned connection between each arm and the felly-member.

6. A vehicle tire having a felly-member and a tread, a plurality of pairs of crossed arms carried by the tread, overlapping leaves on the arms, cushions between the leaves, and cushions between a leaf and the felly-member.

7. A vehicle tire having a felly-member and a tread, a pair of crossed arms carried by the tread, overlapping leaves carried by the arms, a connection between the felly-member and the leaves permitting relative movement of the felly-member and leaves, a spring cushion between the leaves and a spring cushion between the felly-member and a leaf.

8. A vehicle tire, having a felly-member and a tread, a toggle interposed between the felly-member and tread, a spring cushion between the toggle and felly-member, brackets carried by the toggle the tread being secured to the toggle between the brackets.

9. A vehicle tire, having a felly-member and a tread, a toggle interposed between the felly-member and tread, a spring cushion between the toggle and felly-member, brackets carried by the toggle, the tread being secured to the toggle between the brackets, and shields carried by the bracket and extending from the tread to the felly-member.

This specification signed and witnessed this 5th day of November, 1914.

JESSE P. LARRIMER.

Witnesses:
JACOB SCHECHTER,
JOHN L. LOTSCH.